Patented Dec. 2, 1952

2,620,044

UNITED STATES PATENT OFFICE 2,620,044

DUST ADHESIVE FOR GAS FILTERS

Richard D. Fine, Merchantville, N. J., and William L. Trowbridge, Newark, Ohio; said Fine assignor to Atlas Powder Company, Wilmington, Del., a corporation of Delaware, and said Trowbridge assignor to Owens-Corning Fiberglas Corporation, Toledo, Ohio, a corporation of Delaware No Drawing. Application January 10, 1950, Serial No. 137,894

16 Claims. (Cl. 183—45)

The present invention relates to a gas filter having an improved adhesive.

One of the factors which has materially aided in advancing the art of air-conditioning and related fields is the development of air and other gas filters. These filters usually contain an adhesive to which the foreign matter in the air, for example, dirt, lint, soot, and the like, adhere during the filtration and are thereby removed. Because of this ability to help purify the air, such filters find large application in hotels, stores, industrial plants and the like, where they are installed in heating, ventilating, and air-conditioning systems.

A limiting factor to improved performance of these filters and, as well, to even wider application is the lack of an adhesive having satisfactory or even safe properties under all potential conditions normal to the use of a gas or air filter.

For example, one type of filter adhesive that has been used heretofore is petroleum oil and similar carbonaceous, semi-sticky liquids. Obviously, such adhesives burn readily if a flame reaches an air filter and may very easily cause a serious fire. Or, even in the absence of flame, the flash points of the petroleum oils may be reached by merely a rise in temperature and likewise start a fire. Consequently such adhesives are a decided fire hazard. Moreover, experience has shown that such oils slowly drain from the filter medium during a considerable portion of the life of the filter so that the filter suffers from a constantly decreasing efficiency. If heavier oils, which are less flammable although still freely combustible, are used to avoid these problems, the filtering efficiencies are appreciably lowered because of the high viscosities of such oils.

Other attempts to obtain non-flammable filter adhesives by adding highly chlorinated organic compounds to oils of moderate viscosity have reached the same result. The truly flameproof chlorinated compounds, such as the chlorinated naphthalenes, and the chlorinated diphenyls, are solids. When they are mixed with petroleum oils in sufficient amount to provide reasonable fireproofness, the resulting adhesive is pasty solid having a low dust catching efficiency and the added disadvantage of decided odor.

Still other types of filter adhesives emit smoke even though they may not burn with a flame at somewhat elevated temperatures. Further, some adhesives, for example, those aromatic compounds of the prior art which contain the phosphate radical may actually decompose under similar conditions and shed copious quantities of dense white fumes. If the adhesive so smokes or fumes in air filters being used in public buildings or other places where large numbers of people congregate, fear of a supposed fire may result in a panic causing loss of life and property.

For this reason the use of such adhesives in filters for public buildings, theatres, and the like, is not approved unless the amount is so extremely small that this danger is greatly minimized. The maximum amount allowable in many cases is only about one to two per cent adhesive by weight, while it is recognized that as much as ten to fifteen per cent adhesive is preferred to enable the filter to perform at its optimum efficiency.

It is therefore the principal object of this invention to provide an efficient gas filter that is not a fire or panic hazard.

For example, an object is to provide a gas filter which does not burn, smoke or decompose even at temperatures appreciably above room temperature.

Another object is to provide an approved gas filter for public buildings, and the like, having a greatly increased adhesive to filter weight ratio.

A further object is to provide a gas filter carrying a dust adhesive that does not drain from the filter, that has viscosity inducive to good dust catching efficiencies, and that does not have an offensive odor.

More specific objects and advantages are apparent from the following description which merely discloses and illustrates the invention and is not intended to limit the claims.

The present invention comprises a gas filter having a porous medium carrying thereon an adhesive comprising a viscous polyoxygenated organic liquid and a dissolved inorganic acid flame retarding agent. The viscous polyoxygenated organic liquid comprises at least one liquid polyoxyethylene ether of a water-soluble organic polyhydroxylic compound having from 3 to 12 carbon atoms, said ether containing at least one oxyethylene group per original hydroxyl group of said polyhydroxylic compound. The inorganic acid flame retarding agent comprises at least one acid of the group consisting of boric, phosphoric and sulfamic acids.

The liquid polyoxyethylene ethers of the class defined are water soluble, viscous liquids with low volatility. They are preferably made by the direct reaction of ethylene oxide and the polyhydroxylic compound selected. This reaction is well-known and conditions therefor are described in United States Patent No. 1,922,459, and elsewhere in published art. Similar products can be made by condensing preformed polyethylene glycols and the selected polyhydroxylic compound by classical etherification reactions. The ethylene oxide reaction has the advantageous result of producing a mixed product in which a variety of polyoxyethylene ethers are present differing from one another with respect to the number of oxyethylene groups per mol and also with respect to the structural distribution of oxyethylene groups. In describing polyoxyethylene ethers used in this invention reference will be made to "an average" number of oxyethylene groups which in the case of the ethylene oxide reaction products is equivalent to the number of mols of ethylene oxide reacted with one mol of the original polyhydroxylic compound.

The polyoxyhydroxylic ether component of the adhesive can be a mixture of two or more polyoxyethylene ethers differing in the number of oxyethylene groups per mol and/or in the polyhydroxylic compound from which the ethers were made. By mixing polyoxyethylene ethers of different characteristics, properties of viscosity and adaptability to catch different types of dusts, for example, can be varied to suit particular cases.

The flame retarding agent of the dust adhesive is dissolved in the polyoxyethylene ether component in an amount varying from five parts by weight of the acid or mixture of acids per 100 parts of the ether up to the limit of solubility. Preferably, the amount of flame retarding acid is from 10 to 40 parts per 100 parts of the polyoxyethylene ether. It is not necessary to esterify the inorganic acid and the polyoxyethylene ether although some esterification may occur as a result of mixing and standing.

The acidity of the compositions may be neutralized to any desired extent provided that the neutralizing base, which may be either organic or inorganic, is so selected and used in such amount that precipitation of solid matter from the liquid composition is not induced. Among suitable bases for the purpose are the alkali metal hydroxides, ammonia, urea, and the ethanol amines. In the preferred embodiment, the neutralizing agent is triethanolamine.

At the time of application the adhesive composition can be reduced in viscosity by the addition of water or other solvent to assist in application to the filter support.

Examples of polyoxyethylene ethers useful in adhesive compositions according to the invention are the following:

(a) Polyoxyethylene ether of glycerol with an average of 3 oxyethylene groups per mol.
(b) Polyoxyethylene ether of diethylene glycol with an average total of 10 oxyethylene groups per mol.
(c) Polyoxyethylene ether of sorbitol with an average of 6 oxyethylene groups per mol.
(d) Polyoxyethylene ether of sorbitol with an average of 20 oxyethylene groups per mol.
(e) Polyoxyethylene ether of glucose with an average of 6 oxyethylene groups per mol.
(f) Polyoxyethylene ether of diglycerol with an average of 10 oxyethylene groups per mol.
(g) Polyoxyethylene ether of sucrose with an average of 30 oxyethylene groups per mol.
(h) Polyoxyethylene ether of sorbitan with an average of 6 oxyethylene groups per mol.

Example 1

A dust adhesive composition according to the invention is prepared by dissolving 20 parts by weight of orthophosphoric acid and 2.5 parts of boric acid in 100 parts by weight of the polyoxyethylene ether of sorbitol containing an average of 20 oxyethylene groups per mol.

The addition of 9.6 parts by weight of triethanolamine reduces the corrosiveness of the composition towards metals.

This composition, reduced in viscosity by the addition of water, and applied to a glass fiber gas filter in an amount equal to 10% adhesive solids based on the total filter weight, enables it to catch and retain dust particles.

Example 2

A dust adhesive composition was prepared by mixing together at 85° C. 9.7 parts by weight of boric acid and 205.4 parts by weight of polyoxyethylene sorbitan containing an average of 6 oxyethylene groups per mol. After the boric acid had dissolved 3.2 parts by weight of triethanolamine were added and the product cooled to room temperature. At this point, 7.7 parts by weight of 85% phosphoric acid were added and then 19 parts by weight of water to thin the composition to sprayable viscosity.

The composition was sprayed onto a glass fiber air filter in an amount equal to 15% adhesive solids based on the total filter weight.

Example 3

A dust adhesive composition was prepared by dissolving 20 parts of boric acid in 360 parts of polyoxyethylene glycerol containing an average of 6 oxyethylene groups per mol.

The product was reduced in viscosity by the addition of water and was applied to porous filter material by dipping.

Other flame and smoke resistant dust adhesives can be prepared and used in similar manner with other viscous liquid polyoxyethylene ethers of the class defined and the inorganic acid flame retarding agents. The polyoxyethylene ethers are miscible with one another and can be combined in any desired proportions. Likewise, boric acid, phosphoric acid and sulfamic acid can be used either singly or in any combination desired, the total to be at least 5 parts by weight per 100 parts of the ether.

It has been noted that dust and other foreign material caught by filters containing adhesives of the present invention appear to be distributed substantially throughout the interior of the filter pack. This is in marked contrast to the usual result wherein the dust collects substantially on the face of the pack or substantially in a given plane of the pack parallel to the face. Consequently, in filter packs of the present invention, resistance to air flow does not build up nearly as soon as in filter packs containing conventional dust adhesives.

The filtering medium may comprise any strainer or impingement construction. For example, the filtering media may comprise laminations of expanded metal, or of wire screens of various meshes, or a ball type arrangement wherein a series of balls of like or unlike diameters are placed in immediate contact with each other in a three dimensional construction. Or the filtering media may comprise inorganic fibers such as glass wool, rock wool, steel wool, copper wool, aluminum wool, and the like; or, organic fibers, such as hog hair and other animal hair, cactus fibers, resinous fibers, and the like.

In particular, the invention contemplates the type of filter unit disclosed in the United States Patents No. 2,220,127 to Slayter, and Nos. 2,137,246, 2,138,874 and 2,252,724 to Myers. The size and length of the glass fibers of the preferred medium of the present invention are not critical. For example, fibers having diameters from 0.0045 inch to 0.0080 inch and lengths from 5 to 25 or more inches may be used.

Glass fibers having these and similar sizes and dimensions may be attenuated from molten glass through suitable orifices and cast down, for instance, by a steam blower, onto a reticulated moving conveyor, thereby forming a closely interlaced mat of glass fibers arranged in jackstraw fashion, more commonly known as the filter pack. Immediately after its formation, the pack may be sprayed with a solution of any suitable type of resin or elastomer in an amount sufficient to bind the fibers one to another. If a thermosetting resin such as phenol formaldehyde is used, the packs are passed through an oven to polymerize the resin and thereby form a semi-rigid pack. The density of such a pack is limited only by the porosity desired on one hand, and the resistance of the pack to fluid flow through it on the other.

The filter pack may be impregnated or coated with the adhesive immediately after the curing of the bonding resin and while the pack is still on the conveyor on which it was originally formed, or the application of the adhesive may be delayed until the pack is cut, as by large steel knives, to the desired dimensions. Likewise, the adhesive application may be by any of the well-known methods. For example, the pack may be dipped into a vat or tank containing an adhesive of this invention, or the adhesive may be sprayed onto the pack.

The preferred method is first to cut the pack to size by large knives immediately after the curing of the bonding resin and then placing the pack on a moving conveyor passing below a spray nozzle or gun of conventional design from which the adhesive is shot. After the application, the adhesive may constitute 10 to 15 per cent by weight of the filter pack in a typical embodiment of the invention. Less than 10 per cent adhesive may be applied, if desired. The amount of adhesive may exceed 15 per cent depending on the ability of the filter medium to retain it and on the viscosity of the adhesive.

In one embodiment of the invention, a series of such cut adhesive-containing packs are used to build to a desired thickness. The two exposed major faces are then faced with reticulated metallic frames and the entire unit bound on the edges with a fiberboard frame. Such a unit may also contain several filter packs of different densities. The resulting filter may constitute the finished product.

Additional modifications and other arrangements may be made than are here described, the present disclosure being merely illustrative and comprehending all variations thereof.

We claim:

1. A gas filter of the strainer type having a gas-permeable medium carrying a solution of at least one inorganic acid flame retarding agent of the group consisting of boric, phosphoric, and sulfamic acids in a viscous polyoxygenated organic liquid comprising a liquid polyoxyethylene ether of a polyhydroxylic compound having from 3 to 12 carbon atoms, said ether containing at least one oxyethylene group per original hydroxyl group of said polyhydroxylic compound.

2. A gas filter as defined in claim 1 wherein the acidity of the said solution is at least partially neutralized by the addition of a neutralizing base.

3. A gas filter as defined in claim 1 wherein the acidity of the said solution is at least partially neutralized by the addition of thiethanolamine.

4. A gas filter as defined in claim 1 wherein the said liquid polyoxyethylene ether is polyoxyethylene sorbitol.

5. A gas filter as defined in claim 1 wherein the said liquid polyoxyethylene ether is polyoxyethylene sorbitan.

6. A gas filter as defined in claim 1 wherein the said liquid polyoxyethylene ether is polyoxyethylene glycerol.

7. A gas filter as defined in claim 1 wherein the said flame retarding agent is present in the proportion of at least 5 parts by weight per 100 parts by weight of the viscous polyoxygenated organic liquid.

8. A gas filter as defined in claim 1 wherein the said gas-permeable medium comprises fibers.

9. A gas filter as described in claim 1 wherein the said gas-permeable medium comprises glass fibers interlaced in a jackstraw manner.

10. A gas filter as defined in claim 1 wherein the gas-permeable medium comprises a pack consisting of glass fibers interlaced in a jackstraw, overlapping manner and bonded one to another at their junctures by a resin to form a porous, semi-rigid unit.

11. As an article of manufacture, an air filter comprising a pack of glass fibers arranged in a helter-skelter overlapping fashion and bonded one to another at their intersections to form substantially a three-dimensional porous semi-rigid pack, said fibers carrying an adhesive comprising a solution of at least one inorganic acid flame retarding agent of the group consisting of boric, phosphoric, and sulfamic acids in a viscous polyoxygenated organic liquid comprising a liquid polyoxyethylene ether of a polyhydroxylic compound having from 3 to 12 carbon atoms, said ether containing at least one oxyethylene group per original hydroxyl group of said polyhydroxylic compound.

12. A gas filter as claimed in claim 1 wherein said polyoxygenated organic liquid is polyoxyethylene diethylene glycol.

13. A gas filter as claimed in claim 1 wherein said polyoxygenated organic liquid is polyoxyethylene glucose.

14. A gas filter of the strainer type having a gas-permeable medium carrying a solution of at least one inorganic acid flame retarding agent of the group consisting of boric, phosphoric, and sulfamic acids in a viscous polyoxygenated organic liquid comprising a liquid polyoxyethylene ether of a water soluble organic polyhydroxylic compound having from 3 to 12 carbon atoms, said ether containing at least one oxyethylene group per original hydroxyl group of said polyhydroxylic compound.

15. As an article of manufacture, an air filter comprising a pack consisting of glass fibers arranged in a helter-skelter fashion in substantially a three-dimensional relationship and bonded one to another at their intersections by a resin to form a porous semi-rigid pack, said fibers carrying an adhesive comprising a solution of at least one inorganic acid flame retarding agent of the group consisting of boric, phosphoric, and sulfamic acids in a viscous polyoxygenated organic liquid comprising a liquid polyoxyethylene ether of a water soluble organic polyhydroxylic compound having from 3 to 12 carbon atoms, said ether containing at least one oxyethylene group per original hydroxyl group of said polyhydroxylic compound.

16. A substantially planular filter pack adaptable to load substantially uniformly in depth, said pack being built up from glass fibers interlaced in a jackstraw, overlapping manner to form a three-dimensional unit, and a solution contacting the surfaces of the fibers of at least one inorganic acid flame retarding agent of the group consisting of boric, phosphoric, and sulfamic acids in a viscous polyoxygenated organic liquid comprising a liquid polyoxyethylene ether of a polyhydroxylic compound having from 3 to 12 carbon atoms, said ether containing at least one oxyethylene group per original hydroxyl group of said polyhydroxylic compound.

RICHARD D. FINE.
WILLIAM L. TROWBRIDGE.

REFERENCES CITED

The following references are of record in the file of this patent:

UNITED STATES PATENTS

| Number | Name | Date |
|---|---|---|
| 2,137,246 | Myers | Nov. 22, 1938 |
| 2,138,874 | Myers | Dec. 6, 1938 |
| 2,178,614 | Slayter | Nov. 7, 1939 |
| 2,220,127 | Slayter | Nov. 5, 1940 |
| 2,252,724 | Myers | Apr. 19, 1941 |
| 2,443,766 | Hedberg | June 22, 1948 |